(12) United States Patent
Nyer (10) Patent No.: US 11,359,862 B1
(45) Date of Patent: Jun. 14, 2022

(54) METHOD OF CARBON SEQUESTERING

(71) Applicant: Evan Nyer, Tampa, FL (US)

(72) Inventor: Evan Nyer, Tampa, FL (US)

( * ) Notice: Subject to any disclaimer, the term of this patent is extended or adjusted under 35 U.S.C. 154(b) by 0 days.

(21) Appl. No.: 17/669,434

(22) Filed: Feb. 11, 2022

(51) Int. Cl.
   *F26B 7/00* (2006.01)
   *F26B 25/16* (2006.01)
   *B09B 1/00* (2006.01)
   *B09B 3/40* (2022.01)
   *B65D 90/04* (2006.01)

(52) U.S. Cl.
   CPC ............... *F26B 25/16* (2013.01); *B09B 1/00* (2013.01); *B09B 3/40* (2022.01); *B65D 90/041* (2013.01); *F26B 7/00* (2013.01); *B65D 2590/04* (2013.01); *F26B 2200/02* (2013.01); *Y02C 20/20* (2013.01); *Y02W 30/30* (2015.05)

(58) Field of Classification Search
   CPC ......... Y02C 20/20; Y02C 20/40; F26B 25/16; F26B 7/00; F26B 2200/02
   USPC .............................................. 34/380; 422/177
   See application file for complete search history.

(56) References Cited

FOREIGN PATENT DOCUMENTS

DE 19603892 A1 * 8/1996 ................ F26B 1/00

* cited by examiner

*Primary Examiner* — John P McCormack
(74) *Attorney, Agent, or Firm* — Larson & Larson, P.A.; Frank Liebenow; Justin P. Miller (57) ABSTRACT

A method of sequestering carbon captured from the atmosphere by plants (biomass) waste material includes segregating incoming waste material that includes biomass into high-moisture incoming waste material and low-moisture incoming waste material. The low-moisture incoming waste material is that which has a moisture content less than or equal to the moisture content threshold, for example, paper, cardboard, and sawdust. The low-moisture incoming waste material is stored in a dry containment area, thereby emissions of carbon dioxide or methane from the low-moisture incoming waste material is reduced as moisture is required by such material to decompose.

20 Claims, 8 Drawing Sheets

METHOD OF CARBON SEQUESTERING

FIELD

This invention relates to the field of the ecology and more particularly to a method of sequestering carbon captured from the atmosphere by biological means (plants).

BACKGROUND

Carbon dioxide and methane have the ability to absorb heat emitted from the Earth's surface and prevent it from leaving the atmosphere. This is called the greenhouse effect. The greenhouse effect is known to be one of the greatest contributions towards rising temperatures and climate change. Carbon dioxide ($CO_2$) and methane ($CH_4$) gases are among the most impactful carbon-based emissions responsible for the warming of Earth's atmosphere. Human activities such as the burning of fossil fuels and industrial processes have increased the atmospheric concentrations of carbon dioxide and methane gases, thereby amplifying the greenhouse effect. While methane emissions are a small portion of all greenhouse gas emissions, methane is more significant, in that, methane amplifies its contribution to the greenhouse effect. Since both carbon dioxide and methane gases have significant impacts on climate change, removing these gases from the atmosphere has become an increasingly vital action in adapting and mitigating the effects of climate change.

A variety of carbon capture and sequestration technologies have been proposed to address the global effects of climate change in recent years. Many of the carbon capture and sequestration technologies are directly related to power generation or industrial applications. Few stand-alone systems have been implemented. The limited application of carbon capture and sequestration technologies is often attributed to high implementation costs and efficiency penalties incurred in adopting such. These limitations lead to significant challenges in implementing carbon capture and sequestration technologies that address climate change. To achieve global climate goals, such as those associated with the Paris Climate Accord Agreement (United Nations, 2015), significant advancements are needed to increase the efficiency and affordability of carbon capture and sequestration technologies.

One of the primary strategies to minimize carbon dioxide and methane gas concentrations in the atmosphere is to reduce the emissions of the gases at the source. Electricity production and industrial processes are the key producers of these greenhouse gases responsible for 26.9% and 22.0%, respectfully, of the greenhouse gas emissions in the United States in 2018 (EPA, 2020c). An initiative to reduce carbon emissions worldwide is included in the Paris Agreement. The goal of the Paris Agreement is to reduce global warming to below 2, preferably to 1.5 degrees Celsius, in comparison to pre-industrial levels. The agreement operates in a 5-year cycle where the member countries transform their economic and social systems. The member countries were required to submit their plans for climate action known as the Nationally Determined Contributions. There are many significant projects underway to reduce the contribution of heavy emitters to global greenhouse gas concentrations. In the transportation sector, impactful steps are being taken. For example, solar panels and electric cars are becoming more common in hopes of a more sustainable future. There are also moves to increase electric energy use in every country, and many routes are being pursued to obtain sustainable electricity. The United States Department of Energy is investing in a carbon sequestration program that aims to reduce carbon dioxide emissions from power plants (US DOE, 2021). Despite these efforts, preventing climate change from elevating global temperatures requires more than decreasing the rate of carbon emissions; it also requires the sequestering of carbon that would otherwise be released to the atmosphere. While promising trends are present in reducing carbon dioxide and methane emissions at the source, there remains limited progress in the other half of combating climate change—developing carbon capture and sequestration technologies that sequester carbon at a substantial scale.

There are several carbon sequestration technologies currently being utilized or explored. Despite their promise in capturing carbon from several emission points, many of these technologies do not deliver carbon removal in a cost-effective manner.

One carbon sequestration technology is pre-combustion capture or reacting a fuel with oxygen or air along with steam creates pre-combustion capture. Through this reaction, a synthesis gas is created and composed of carbon monoxide with hydrogen. Steam reacts with carbon monoxide inside a catalytic reactor, identified as a shift converter, to produce carbon dioxide and hydrogen. The carbon dioxide is separated from the hydrogen which ultimately provides a hydrogen-rich fuel. The fuel can be used in other applications such as furnaces, boilers, engines, fuel cells, and gas turbines. Before burning this fuel, carbon dioxide is recovered. The cost and the size of the pre-combustion technology is adaptable and it is possible to reduce overall costs. Consequently, this combustion technology inherently produces concentrated carbon dioxide streams.

Another carbon sequestration technology is post-combustion capture. Post-combustion capture involves the removal of carbon dioxide from flue gas produced by the combustion of fossil fuels or biomass and is often used in coal and natural gas power plants, as well as industrial applications. Post-combustion capture works by directing flue gas through equipment that removes any carbon dioxide. The removed carbon dioxide is fed into a storage reservoir while the remaining flue gas will be released into the atmosphere. To separate the carbon dioxide from the flue gas, a chemical sorbent is used. The sorbent captures the carbon dioxide and transfers it to a different vessel where the carbon dioxide is released by to heat and stored. Existing power plants use air which is around 80% nitrogen for combustion, generating a flue gas at an atmospheric pressure that has a carbon dioxide concentration of less than 15%. Conclusively, thermodynamic driving forces for carbon dioxide capture from flue gas are low and create a technical challenge for the development of cost-effective advanced capture processes. Post-combustion capture proves useful as it is cost-effective to retrofit existing power plants that generate two-thirds of the carbon dioxide emissions in the power sector. New forms of post-combustion technology are being researched.

Another carbon sequestration technology is oxy-combustion which is an alternative to capturing carbon from flue gas. Oxy-combustion is performed by modifying the combustion process so there is a high concentration of carbon dioxide within the flue gas and, therefore, it is easier to capture the carbon dioxide. This technology has a promising future because the flue gas (mostly carbon dioxide) is later mixed with pure oxygen and burned. Since pure oxygen is used in oxy-combustion instead of air, less nitrogen gas (air is around 80% nitrogen) is heated/burned and a flue gas results that is primarily carbon dioxide and water. If the fuel is burned in pure oxygen, the flame temperature is extremely high and the flue gas comprising carbon dioxide and water is often fed back into the combustion to moderate the flame. Low-temperature air separation is ideal for oxygen creation and for new techniques to supply oxygen to the fuel. Pure oxygen is mixed with the recycled flue gas before combustion to create an air-fired configuration. This is desirable as current construction materials cannot withstand the high temperatures associated with coal and pure oxygen combustion. The main benefit of oxy-combustion is that the flue gas is predominantly composed of carbon dioxide and water. The water can be removed by condensation, and the remaining carbon dioxide goes through further processing to be purified. The remaining carbon dioxide in the flue gas is conditioned and dried.

Further, new carbon sequestration technologies are being developed around the world. One example of such is direct carbon capture from the air which works with carbon dioxide collectors in a two-step process. Carbon dioxide collectors take in air with a fan where the carbon dioxide is captured on the surface using a highly selective filter material. Once the filter material is full, the carbon collector is closed and the temperature is increased to 80-100° C. The temperature increase allows the carbon to be released and collected as a byproduct in a high purity and highly concentration form. The byproduct is then mixed with water and pumped deep underground to undergo mineralization. Carbon dioxide naturally reacts with basalt rock and turns into stone after many years.

Another upcoming form of carbon sequestration is the acceleration of the carbon silicate cycle. This technology is found on Green Sand Beach in Hawaii where the beach sand has an abundance of olivine, a volcanic mineral that absorbs carbon dioxide from the air. The movement of the waves on the beaches, which pull the olivine into the ocean, can increase the role of the ocean as a carbon sink, along with the added benefit of combating ocean acidification. It has been estimated that if the olivine was deployed on only 2% of global shelf seas, there would be a high capture rate of human carbon emissions.

Another prior method of carbon sequestering is to seal an area of landfill so any emitted carbon dioxide and methane is not leaked into the atmosphere. As decomposition of the sealed landfill will constantly emit carbon dioxide and methane, eventually the pressure of gases in this sealed area will need to be vented, at which time the carbon dioxide and methane must be captured and processed so as not to be released into the atmosphere.

Implementing the above noted or many other technologies to reduce carbon dioxide emissions, although intriguing, there are several downsides. Pre-combustion is difficult to implement as such cannot be added to an existing power plant. Therefore, the capital costs for a pre-combustion plant are significantly higher than the costs associated with an existing power plant, so owners will resist changes. To build a power plant with pre-combustion technology is estimated to cost over a billion dollars. Post-combustion also uses a sensitive solvent that is easily degraded by oxygen, adding a challenge in producing, maintaining and supplying of such solvents. The primary disadvantage of oxyfuel combustion is the overall energy required to produce pure oxygen needed for the combustion process. Additionally, oxy-combustion requires a redesign of the gas turbines.

None of the above use natural biological methods to capture the carbon. Biomass includes natural products like leaves, wood, crops, cotton, etc., and manmade products like paper, cardboard, packaging, etc. A method to sequester this captured carbon is needed, especially when the manmade product pays for the capture part of the process and we only have to pay for the sequestering part of the process. Currently biomass is either recycled, burned as a replacement fuel (biofuels), composted or placed in a landfilled. While these methods can be useful, they all return the carbon back to the atmosphere as carbon dioxide or methane.

What is needed is a system and that will sequester carbon, typically after the carbon has had a useful life.

SUMMARY

In one embodiment, a method of sequestering waste material (e.g., biomass with or without other materials) includes segregating incoming waste material into high-moisture incoming waste material and low-moisture incoming waste material. The high-moisture incoming waste material is that which has a moisture content greater than a moisture content threshold and the low-moisture incoming waste material is that which has a moisture content less than or equal to the moisture content threshold. The low-moisture incoming waste material is stored in a dry containment area, thereby emissions of carbon dioxide or methane from the low-moisture incoming waste material are reduced or eliminated.

In another embodiment, a system for segregated sequestering of waste material is disclosed including a quantity of low-moisture incoming waste material having the moisture content less than or equal to a moisture content threshold (e.g., 30% moisture content) and a device for storing waste material such that the moisture content of material stored remains less than or equal to the moisture content threshold. The system for segregated sequestering of waste material moves the quantity of the low-moisture incoming waste material to the means for storing waste material and, thereby, limiting decomposition of the low-moisture incoming waste material and production of carbon dioxide and methane gases.

In another embodiment, an apparatus for segregated sequestering of waste material is disclosed. The waste material includes low-moisture incoming waste material having the moisture content less than or equal to a moisture content threshold and high-moisture incoming waste material having the moisture content greater than the moisture content threshold including. The apparatus includes a device for storing low-moisture waste material such that the moisture content of the low-moisture waste material remains less than or equal to the moisture content threshold thereby reducing production of carbon dioxide and methane gases. A device moves the quantity of the low-moisture incoming waste material to the means for storing low-moisture waste material where the moisture content of the low-moisture incoming waste material remains less than or equal to the moisture content threshold.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Reference will now be made in detail to the presently preferred embodiments of the invention, examples of which are illustrated in the accompanying drawings. Throughout the following detailed description, the same reference numerals refer to the same elements in all figures.

Biomass is typically carbon that is extracted from the atmosphere by plants (even if the plant has been eaten by an animal, the carbon is still from the atmosphere). In the past, biomass was burned, composted, or placed in landfills leading to the carbon being returned to the atmosphere (e.g., as carbon dioxide and methane gases). Throughout this specification, the term waste material is used to describe biomass with or without non-biomass materials such as glass, metal, plastics, electronics, etc., without respect to the origin of the biomass material. For example, the biomass material is anticipated to be captured through recycling or it is also anticipated that the biomass material be material grown specifically for carbon sequestering. The described systems and methods are ideally suited for pure biomass, but work equally well for waste materials that are biomass plus other materials such as glass, metal, plastics, electronics, etc., though the latter are preferably exclude as there is no carbon credit given for such other materials and the costs to sequester the biomass portion of the waste material is not impacted by the storage requirements of the other materials. It is far better to separate the biomass from the other materials and store the other materials in existing landfill areas.

There are several methods for preventing the breakdown of carbon-based materials such as paper, cardboard, or sawdust into carbon dioxide and/or methane. Biodegradation is affected by controlling any one of the four key parameters involved in the transformation or decomposition of the carbon-based materials that produces carbon dioxide and/or methane. An environment is created that stops biological activity making it not necessary to kill the microorganisms, only to stop their biological processes. Through proper control, emission of carbon dioxide and/or methane can be prevented. The four potential parameters for control are pH, temperature, salt, and moisture. If the carbon-based materials cannot decompose due to the control of one or several such parameters, the carbon content of the carbon-based materials in its entirety is considered sequestered carbon. The disclosed segregated carbon sequestering controls one such parameter, that being moisture. By controlling moisture in the carbon-based materials, the segregated carbon sequestering prevents the breakdown of the carbon-based materials, thus eliminating associated emissions (e.g., carbon dioxide and/or methane) and enabling sequestering of the carbon.

It is known that carbon-based waste material having high moisture content (e.g., moisture content greater than 30%) decays, releasing carbon dioxide and methane into the atmosphere and contributing to greenhouse gases. Many municipalities place such waste in landfills where the carbon-based waste material decomposes and emits carbon dioxide and methane into the atmosphere.

Although there has been a global effort to recycle paper and paper products, such effort is slowing due to weak demand and because much of the recycled product is contaminated with materials such as plastic, paper coatings, envelope windows, food, etc., therefore much of the paper-based waste material is winding up in landfills. It should be noted that such paper-based waste and many other low-moisture waste such as sawdust, wood chips, and dry leaves, have a naturally low moisture content, usually less than 30% moisture.

Figure 1:
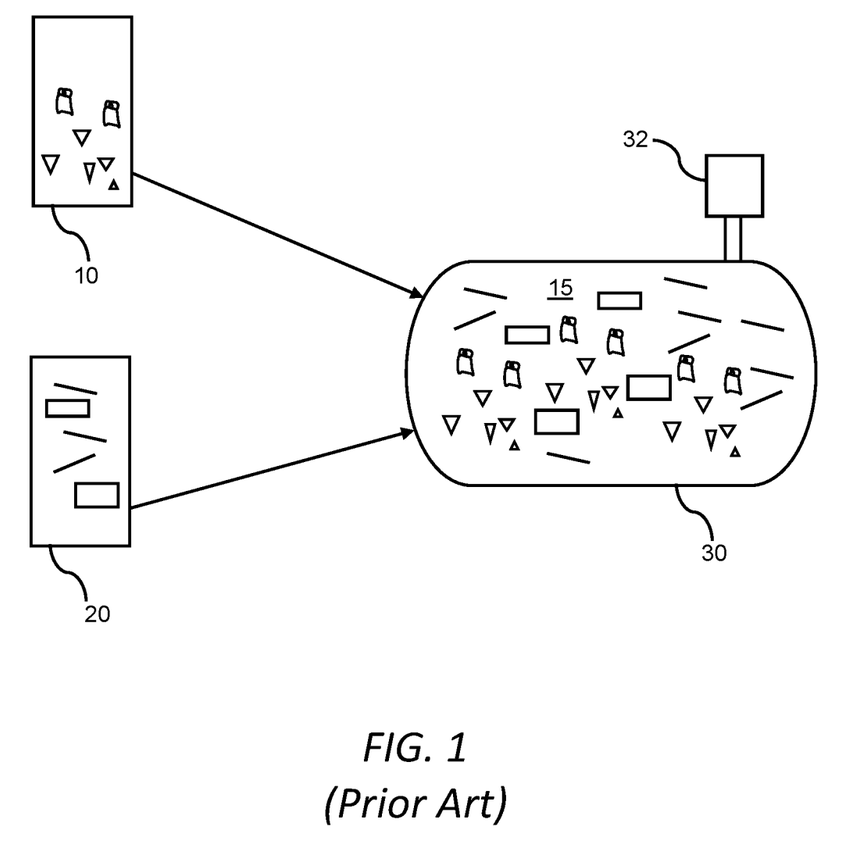
FIG. 1 illustrates a system and method of carbon sequestering of the prior art.

Referring to FIG. 1, a system and method of carbon sequestering of the prior art is shown. In this prior method of carbon sequestering, both wet incoming waste material 10 and dry incoming waste material 20 are combined into a combined wet waste material 15, are sealed in a containment 30 area of landfill. Any emitted carbon dioxide and methane produced by the wet waste material 15 are vented and processed by a scrubber/separator 32 so as not to be released into the atmosphere. In this method, there are yearly costs to operating the scrubber/separator 32 and costs of disposing or recycling the resulting biproducts.

Referring to FIGS. 2, 3, 3A, 4, 5, and 5A a system and method of segregated carbon sequestering is shown. In this method of segregated carbon sequestering, the low-moisture incoming waste material 20 is stored as low-moisture waste material 27 (e.g., less than a moisture content threshold of 30%), sealed in a dry containment system 130 or dry containment area in a landfill. The high-moisture incoming waste material 10 is still stored as wet waste material 17 in the containment area 30 of the prior art as per FIG. 1, but the quantity of the wet waste material 17 is less than was stored as per the prior art. Therefore, little or no carbon dioxide and methane are released from the low-moisture waste material 27 and, therefore, the dry containment system 130 does not require venting. Note that in arid locations such as the desert southwest, it is anticipated that the dry containment system 130 be an open area as, once the low-moisture incoming waste material 20 is segregated, there is little chance that the moisture content of the low-moisture incoming waste material 20 will rise to a level in which biological activity will occur and carbon dioxide and methane will be released. In the method of segregated carbon sequestering, there are no yearly costs for operating a scrubber/separator 32 for the dry containment system 130 or costs of disposing or recycling the resulting biproducts as in the prior methods discussed with FIG. 1.

The moisture content threshold of 30% is easily achieved with paper as paper products are designed to have moisture content levels of 2-10%.

Figure 2:
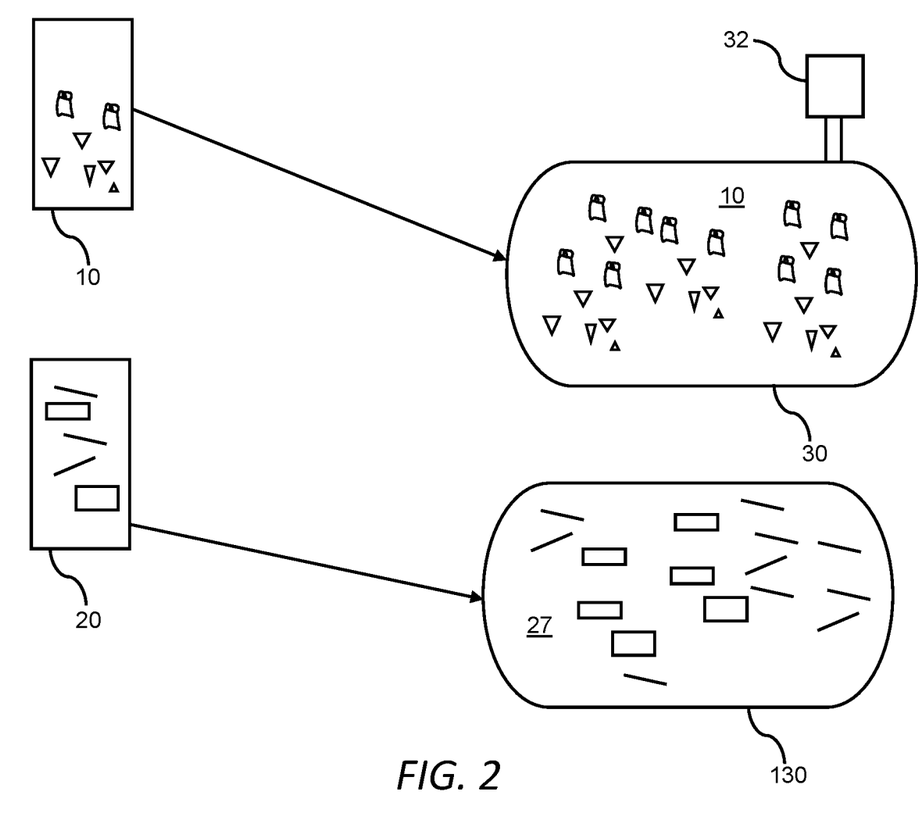
FIGS. 2, 3, 3A, 4, 5, and 5A illustrate a system and method of carbon sequestering.

In FIG. 2, the method of segregated carbon sequestering incudes pre-segregating the waste material, for example, using recycling programs to collect low-moisture incoming waste material 20 (e.g., paper, cardboard, electronics) that is not contaminated with high-moisture incoming waste material 10 (e.g., food waste, diapers, wet leaves). The high-moisture incoming waste material 10 still requires a containment system 30 having a vent/scrubber 32 as in the prior art or can be sent to existing landfills, but a significant portion of the overall waste material (the low-moisture incoming waste material 20) is stored in the dry containment system 130 that reduces costs by not requiring venting and scrubbing. Note that it is fully anticipated that the low-moisture incoming waste material 20 be pre-sorted to remove and recycle reusable materials such as newspaper, metal cans, and cardboard, leaving materials such as contaminated paper (e.g., shredded paper, envelopes with plastic windows or metal fasteners, coated paper) that are stored in the dry containment system 130. It is also anticipated that non-carbon-based materials (e.g., electronics, batteries, metal) be removed and disposed through recycling, landfilling, etc.

For long-term carbon sequestering, the dry containment system 130 of a landfill is anticipated to have a well-sealed, durable liner that will withstand storage demands for the desired storage time. Double geomembrane lining system polymers, such as a high-density polyethylene liner is utilized to ensure that the low-moisture waste material 27 stored within the membrane system of the dry containment system 130 remains below the moisture content threshold.

As the membrane of the dry containment system must keep out moisture, it is anticipated that such liners must have a permeability of no more than $1 \times 10^{-7}$ cm/s. The requirement for permeability delineates an impervious substance to any value below $1 \times 10^{-6}$ cm/s. Although some moisture may leak into the system over time, the membranes currently used in landfill liners have a permeability well below $1 \times 10^{-7}$ cm/s and, therefore, will maintain the required moisture levels for the long term. It is further anticipated that the landfill liners used in for the dry containment system 130 also have a double geomembrane lining system to further prevent water from permeating the system. In one anticipated dry containment system 130 that is double-lined, there is an outer liner is made from a sturdy material such as clay and an inner liner is made from a low-porous material such as high-density polyethylene. In such, in time, it is anticipated that water will eventually break through the outer liner, but with the smaller permeability of high-density polyethylene membranes ($1 \times 10^{-12}$ cm/s) of the inner liner, stops the water before the water reaches the low-moisture waste material 27. Selection of materials used to fabricate the dry containment system 130 is based upon the hydrodynamics of the target landfill. For example, materials used to fabricate the dry containment system 130 in a landfill with a high water table includes the above noted double-lined membrane while materials used to fabricate the dry containment system 130 in an arid area with very deep water tables include a single layer membrane or a membrane fabricated from lower-cost materials. Note in arid areas, it is anticipated that the dry containment system 130 be minimal as there is little possibility of adding moisture to the material stored therein, for example, a slab or hole dug in the ground.

Figure 3:
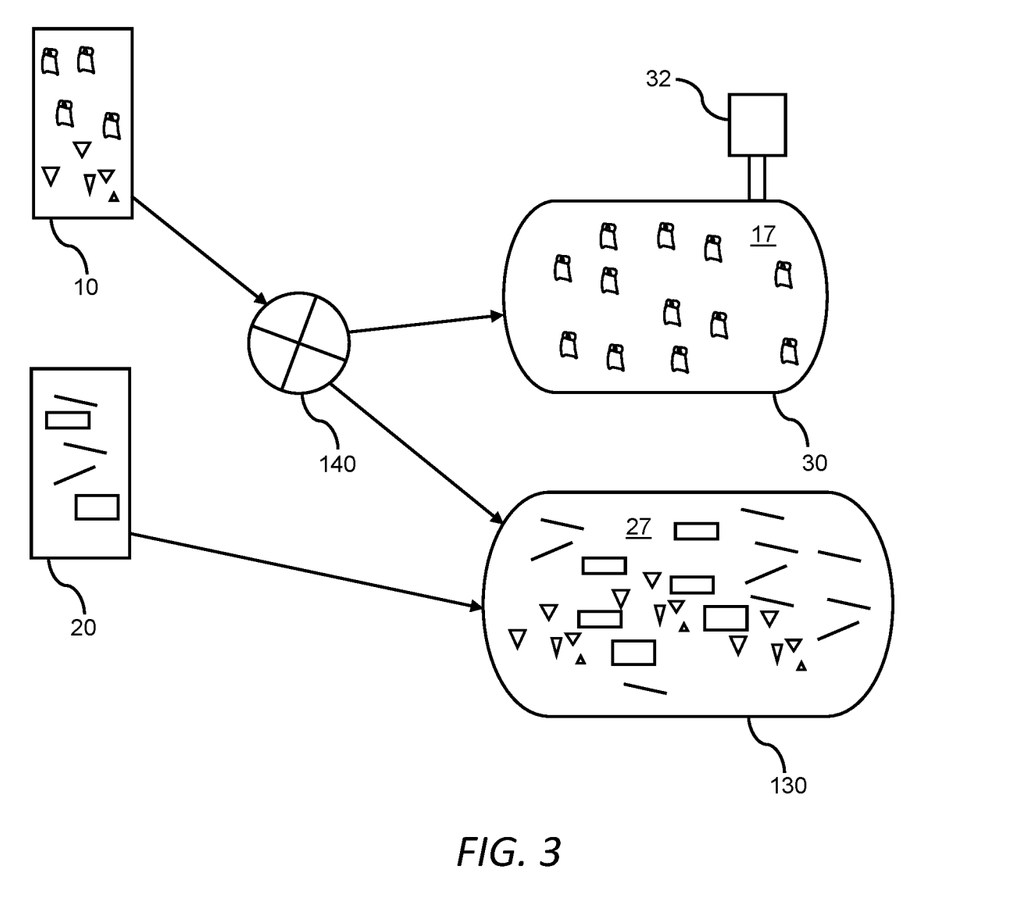
Figure 3A:
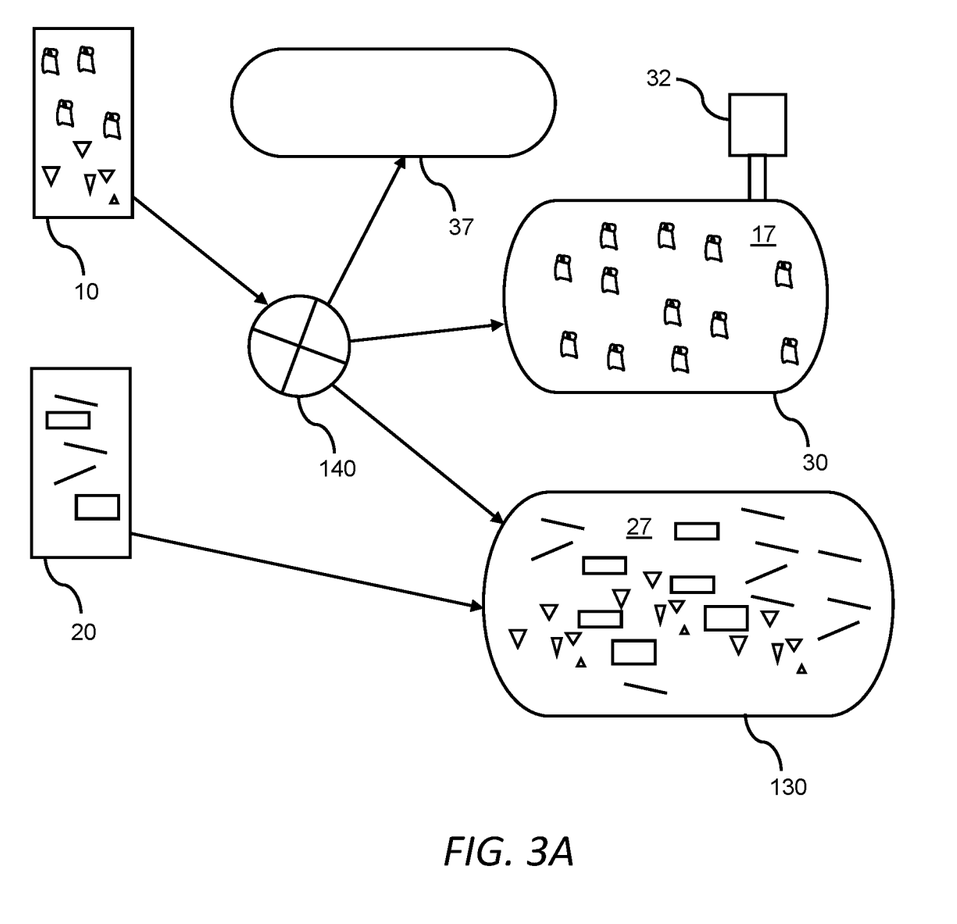

In FIG. 3, another embodiment of the segregated carbon sequestering incudes pre-segregating the waste material, for example, using recycling programs to collect low-moisture incoming waste material 20 (e.g., paper, cardboard, electronics) that is not contaminated with high-moisture waste material 10 (e.g., food waste, diapers, wet leaves). A sorter 140 separates the high-moisture incoming waste material 10 based upon moisture content and the portion of the high-moisture incoming waste material 10 that has a high moisture content still requires a containment system 30 having a vent/scrubber 32 for storing the wet waste material 17 (or is moved to contemporary landfills 37 as in FIG. 3A) as in the prior art. but a more significant portion of the overall waste material (the low-moisture waste material 27) is stored in the dry containment system 130 that reduces costs by not requiring venting and scrubbing. The sorter 140 separates materials moving materials with high moisture content (e.g., wet diapers, food, wet leaves) to containment system 30 having a vent/scrubber 32 or to contemporary landfills 37 as in the prior art. In some embodiments, as shown in FIG. 3A, the remaining waste material that has little or no moisture content is moved to the dry containment system 130. Although it is anticipated that some low-moisture non-carbon materials be moved to the dry containment system 130, it is preferred that only low-moisture dry carbon-based materials be stored in the dry containment system 130.

Note again that it is fully anticipated that the low-moisture incoming waste material 20 be pre-sorted to remove and recycle reusable materials such as newspaper, metal cans, and cardboard, leaving materials such as contaminated paper (e.g., shredded paper, envelopes with plastic windows or metal fasteners, coated paper) that are stored in the dry containment system 130.

Figure 4:
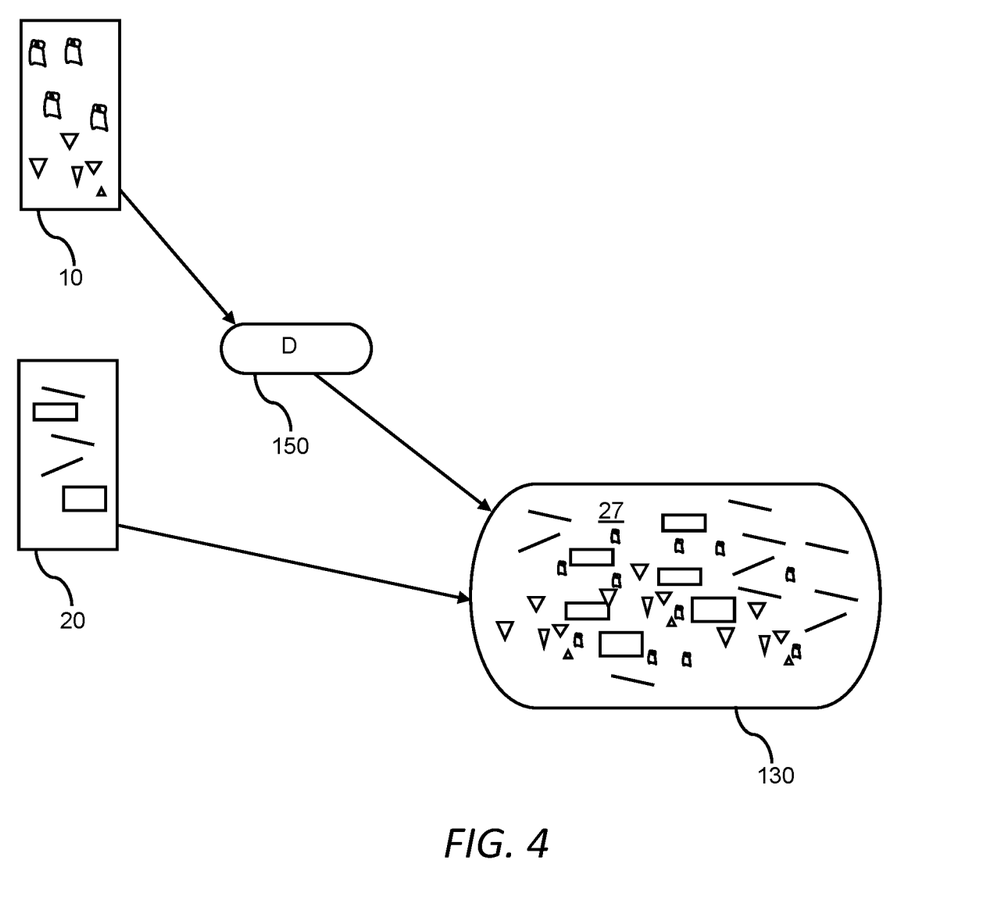

In FIG. 4, another embodiment of the segregated carbon sequestering incudes pre-segregating the waste material, for example, using recycling programs to collect low-moisture incoming waste material 20 (e.g., paper, cardboard, electronics) that is not contaminated with high-moisture incoming waste material 10 (e.g., food waste, diapers, wet leaves). In this embodiment, the high-moisture incoming waste material 10 is dried by a drying system 150 to reduce the moisture content to a point below which the resulting waste material will not produce carbon monoxide and/or methane (e.g., to a moisture content below approximately 30%). In this embodiment, all of the overall waste material (the low-moisture incoming waste material 20 and the dried high-moisture incoming waste material 10) is stored in the dry containment system 130, reducing costs by not requiring venting and scrubbing. Again, it is anticipated that the high-moisture incoming waste material 10 will included some amount of non-carbon-based material, but it is preferred to limit the amount of non-carbon-based material that is moved to the dry containment system 130 as the non-carbon-based material is better stored in contemporary landfills 37 at a lower cost.

Therefore, the yearly costs of operating the containment system 30 with venting 32 are eliminated, but initial costs such as energy costs for the drying system 150 are incurred.

Figure 5:
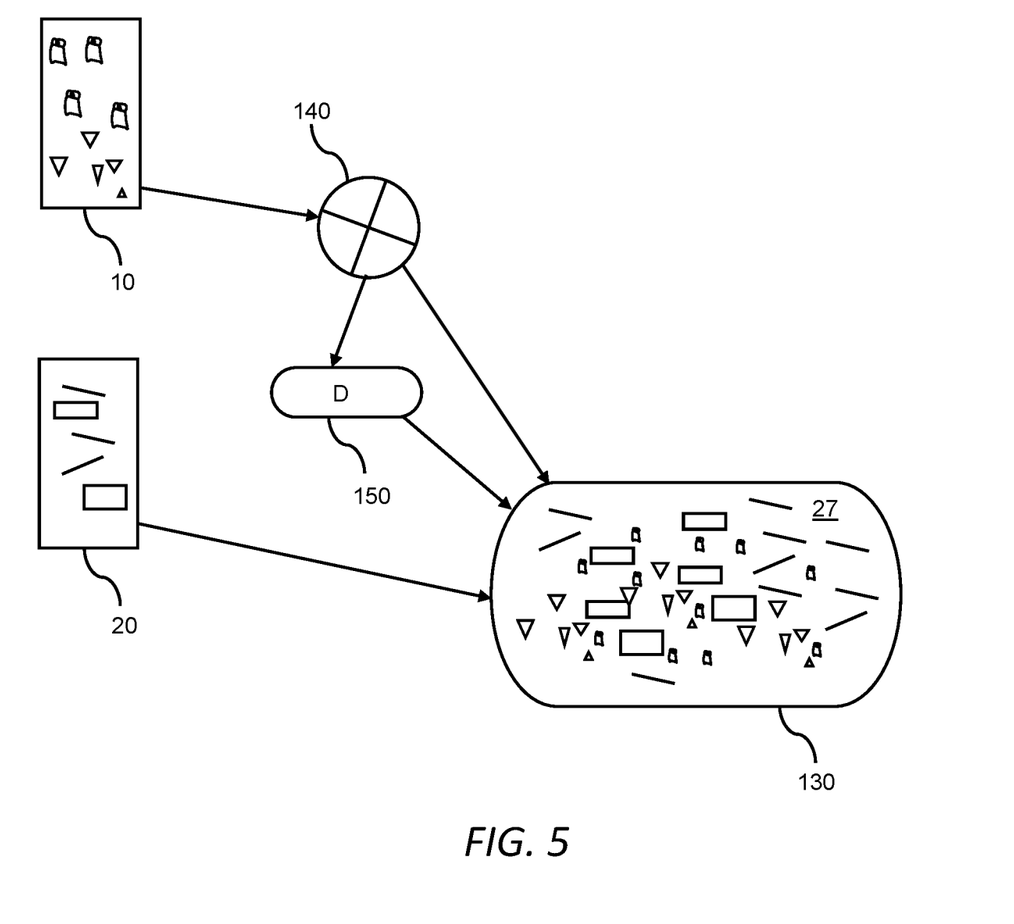

In FIG. 5, another embodiment of the segregated carbon sequestering incudes pre-segregating the waste material, for example, using recycling programs to collect low-moisture incoming waste material 20 (e.g., paper, cardboard, electronics) that is not contaminated with high-moisture incoming waste material 10 (e.g., food waste, diapers, wet leaves). In this embodiment, the sorter 140 removes materials that have little or no moisture content from the high-moisture incoming waste material 10 such as plastics, plastic foam (e.g., egg cartons), metals, glass (e.g., light bulbs) which go directly to the dry containment system 130. The remaining high-moisture incoming waste material 10 from the sorter 140 is then dried by the drying system 150 to reduce the moisture content to a point below that in which the resulting waste material will produce carbon monoxide and/or methane (e.g., to a moisture content below 30%). In this embodiment, all of the overall waste material (the low-moisture waste material 20 and the sorted/dried high-moisture waste material 10) is stored in the dry containment system 130, reducing costs by not requiring venting and scrubbing. Therefore, the yearly costs of operating the containment system 30 with venting 32 are eliminated, but initial costs such as energy costs for the sorting system 140 and drying system 150 are incurred, but it is anticipated that the cost of sorting is lower than the energy costs associated with drying, therefore it is economical to sort first before drying.

It should be noted that it is anticipated that the drying system 150 be any system that will dry the high-moisture incoming waste material 10 to the desired moisture content, including, but not limited to, air-drying (e.g., on racks) and thermal drying (e.g., using heated tumblers).

Figure 5A:
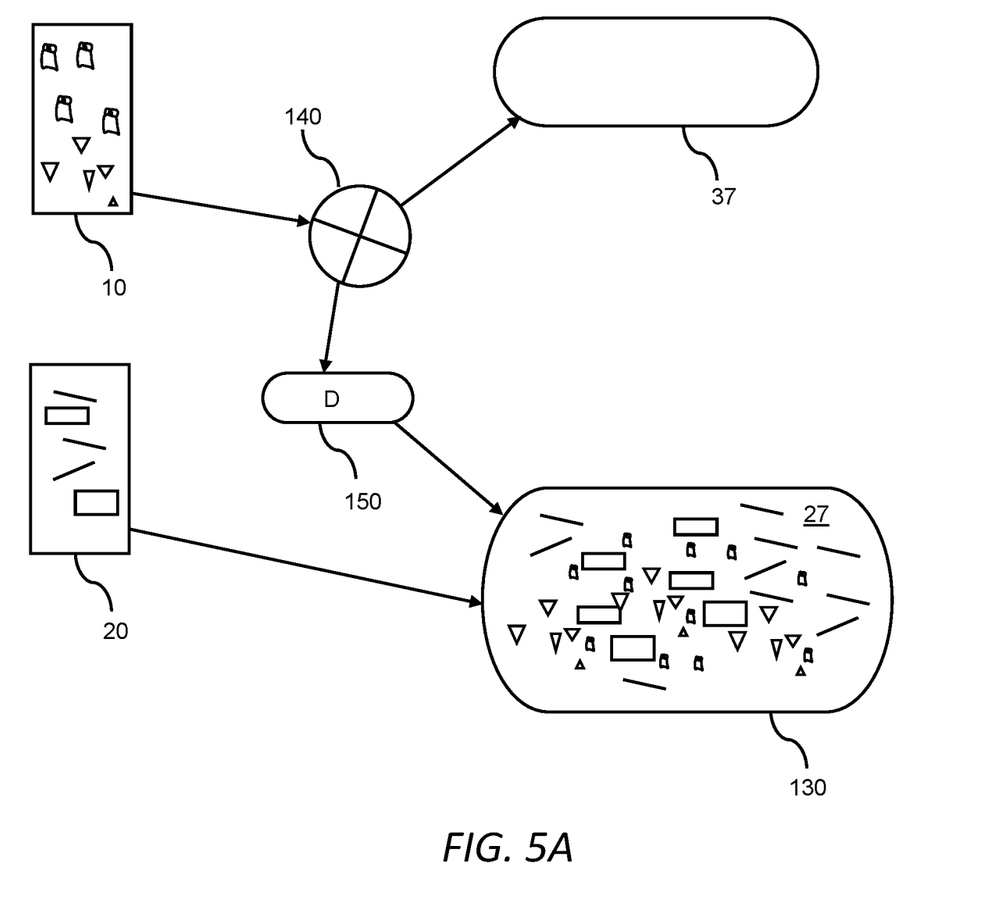

In some embodiments, as shown in FIG. 5A, the sorting system 140 removes at least some non-biomass waste material (e.g., rock, glass, metal, electronics) and moves this non-biomass waste material to the contemporary landfills 37 or other lower-cost storage area. The remaining waste material that is predominately biomass is then dried by the drier 150 to reduce the moisture content to a moisture content that is lower than needed to prevent decomposition (e.g., lower than a moisture threshold of approximately 30%) and then moved to the dry containment system 130. Although it is anticipated that some low-moisture non-carbon materials be moved to the dry containment system 130, it is preferred that only low-moisture dry carbon-based materials (e.g., biomass) be stored in the dry containment system 130.

Figure 6:
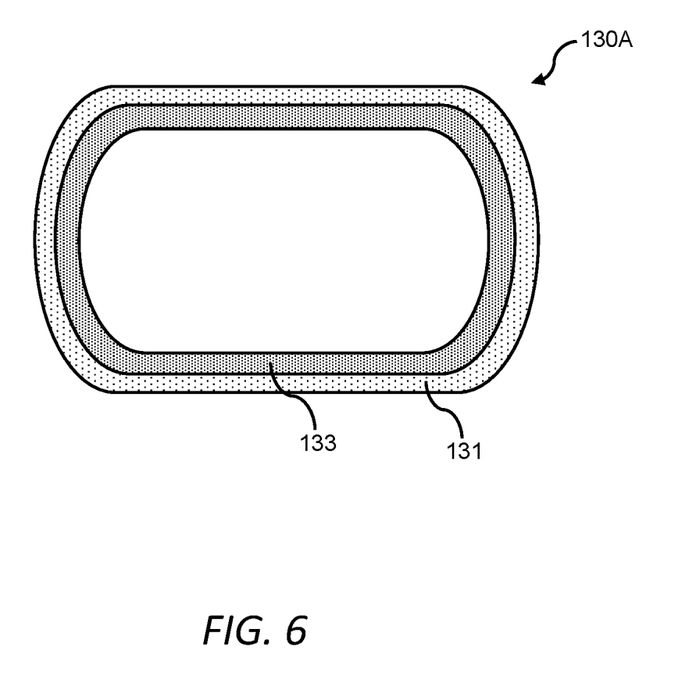
FIG. 6, illustrates a double-lined dry containment area.

Referring to FIG. 6, a double-lined dry containment system 130A is shown. In this, there is an outer liner 131 made of a material such as clay or concrete and an inner liner 133 made of a low-porous material such as high-density polyethylene. In such, in time, it is anticipated that water will eventually break through the outer liner 131, but with the smaller permeability of the inner liner 133 (e.g., made of high-density polyethylene membranes ($1 \times 10^{-12}$ cm/s)), the water is be stopped before reaching the low-moisture waste material 20. Selection of materials used to fabricate the inner liner 133 and the outer liner 131 are based upon the hydrodynamics of the target landfill.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A method of sequestering carbon-based material, the method comprising:
    segregating incoming carbon-based material into high-moisture incoming carbon-based material and low-moisture incoming carbon-based material, the high-moisture incoming carbon-based material having a moisture content greater than a moisture content threshold and the low-moisture incoming carbon-based material having a moisture content less than or equal to the moisture content threshold; and
    storing the low-moisture incoming carbon-based material in a dry containment area, thereby emissions of carbon dioxide or methane from the low-moisture incoming carbon-based material is reduced or eliminated.

2. The method of claim 1, wherein the dry containment area maintains the low-moisture incoming carbon-based material at a moisture content less than or equal to the moisture content threshold.

3. The method of claim 1, further comprising sorting the high-moisture incoming carbon-based material into high-moisture carbon-based material and remaining low-moisture carbon-based material, the remaining low-moisture carbon-based material having the moisture content that is less than the moisture content threshold, and storing the remaining low-moisture carbon-based material in the dry containment area.

4. The method of claim 3, further comprising drying the high-moisture carbon-based material into carbon-based material that has a moisture content that is less than the moisture content threshold and storing a carbon-based material that has been dried in the dry containment area.

5. The method of claim 1, further comprising drying the high-moisture incoming carbon-based material to have the moisture content that is less than a moisture content threshold and storing resulting carbon-based material that has been dried in the dry containment area.

6. The method of claim 1, wherein the moisture content threshold is 30%.

7. A system for segregated sequestering of waste material, the system comprising:
    a quantity of low-moisture incoming waste material comprising biomass and having a moisture content less than or equal to a moisture content threshold;
    a dry containment system for storing the waste material such that the moisture content of the waste material remains less than or equal to the moisture content threshold; and
    the system for segregated sequestering of waste material moves the quantity of the low-moisture incoming waste material to the dry containment system for storing the waste material, thereby limiting decomposition of the low-moisture incoming waste material and limiting production of carbon dioxide and/or methane gases.

8. The system for segregated sequestering of waste material of claim 7, wherein the moisture content threshold is 30%.

9. The system for segregated sequestering of waste material of claim 7, further comprising a quantity of high-moisture incoming waste material comprising biomass and having a moisture content greater than the moisture content threshold; the system for segregated sequestering of waste material having means for drying the high-moisture incoming waste material to make low-moisture waste material having a moisture content of the low-moisture waste material be less than or equal to the moisture content threshold and the system for segregated sequestering of waste material moves the low-moisture waste material to the dry containment system for storing the waste material.

10. The system for segregated sequestering of waste material of claim 7, further comprising a quantity of mixed incoming waste material comprising biomass and having high moisture content in which the moisture content is greater than the moisture content threshold and having low moisture content in which a moisture content is less than or equal to the moisture content threshold; the system for segregated sequestering of waste material having means for sorting the mixed incoming waste material to move the low moisture content in which the moisture content is less than or equal to the moisture content threshold to the dry containment system for storing the waste material.

11. The system for segregated sequestering of waste material of claim 10, further comprising means for drying content that dries the high moisture content to make low-moisture waste material having the moisture content of less than or equal to the moisture content threshold and the system for segregated sequestering of waste material moves the low-moisture waste material to the dry containment system for storing the waste material.

12. An apparatus for segregated sequestering of waste material, the waste material comprising low-moisture incoming waste material that comprises biomass material and has a moisture content less than or equal to a moisture content threshold and high-moisture incoming waste material that comprises biomass material and has the moisture content greater than the moisture content threshold, the apparatus comprising:

a dry containment system for storing low-moisture waste material such that the moisture content of the low-moisture waste material remains less than or equal to the moisture content threshold thereby reducing production of carbon dioxide and methane gases; and a device moves the low-moisture incoming waste material to the dry containment system for storing the low-moisture waste material where the moisture content of the low-moisture incoming waste material is maintained at less than or equal to the moisture content threshold.

13. The apparatus for segregated sequestering of waste material of claim 12, wherein the moisture content threshold is 30%.

14. The apparatus for segregated sequestering of waste material of claim 12, further comprising means for drying the high-moisture incoming waste material to make low-moisture waste material having a moisture content of less than or equal to the moisture content threshold and after the high-moisture incoming waste material is dried to a moisture level that is less than or equal to the moisture content threshold, the device moves the low-moisture waste material to the dry containment system for storing the waste material.

15. The apparatus for segregated sequestering of waste material of claim 12, wherein the dry containment system for storing the low-moisture waste material comprises a liner that reduces moisture permeation into the low-moisture waste material.

16. The apparatus for segregated sequestering of waste material of claim 15, wherein the liner is made of high-density polyethylene.

17. The apparatus for segregated sequestering of waste material of claim 15, further comprising an outer liner, the outer liner further protecting the liner from the moisture permeation.

18. The apparatus for segregated sequestering of waste material of claim 17, wherein the outer liner is made of clay.

19. The apparatus for segregated sequestering of waste material of claim 17, wherein the outer liner is made of concrete.

20. The apparatus for segregated sequestering of waste material of claim 17, wherein the dry containment system for storing the low-moisture waste material is located in an arid area and the dry containment system for storing the low-moisture waste material is an open area.

\* \* \* \* \*